United States Patent [19]

Henderickson

[11] Patent Number: 5,109,899
[45] Date of Patent: May 5, 1992

[54] CANT-MAKING APPARATUS AND PROCESS

[76] Inventor: Ken Henderickson, P.O. Box 4026, Port Angeles, Wash. 98362

[21] Appl. No.: 648,478

[22] Filed: Jan. 31, 1991

[51] Int. Cl.$^5$ ............................................. B27B 1/00
[52] U.S. Cl. .............................. 144/378; 83/471.2; 83/884
[58] Field of Search .............. 83/411.7, 471.1, 471.2, 83/471.3, 485, 704, 873, 884; 144/377, 378

[56] References Cited

U.S. PATENT DOCUMENTS

| | | | |
|---|---|---|---|
| 3,398,771 | 8/1968 | May | 83/471.2 |
| 4,068,695 | 1/1978 | Seaman | 83/411.7 |
| 4,104,944 | 8/1978 | Janssen | 83/411.7 |
| 4,271,736 | 6/1981 | Jones | 83/156 |
| 4,753,144 | 6/1988 | May | 83/471.2 |
| 4,867,213 | 9/1989 | Bolton et al. | 144/357 |

*Primary Examiner*—W. Donald Bray
*Attorney, Agent, or Firm*—Robert W. Beach

[57] ABSTRACT

Coaxial centers for engaging opposite ends of a log sector to turn about the axis through the centers are mounted on a frame below an overhead sawing device movable along a track extending lengthwise of such axis. Such frame is tiltable about an axis extending transversely of the track supporting the sawing device to alter the angular relationship between the axis through the centers and the track guiding the sawing device.

11 Claims, 4 Drawing Sheets

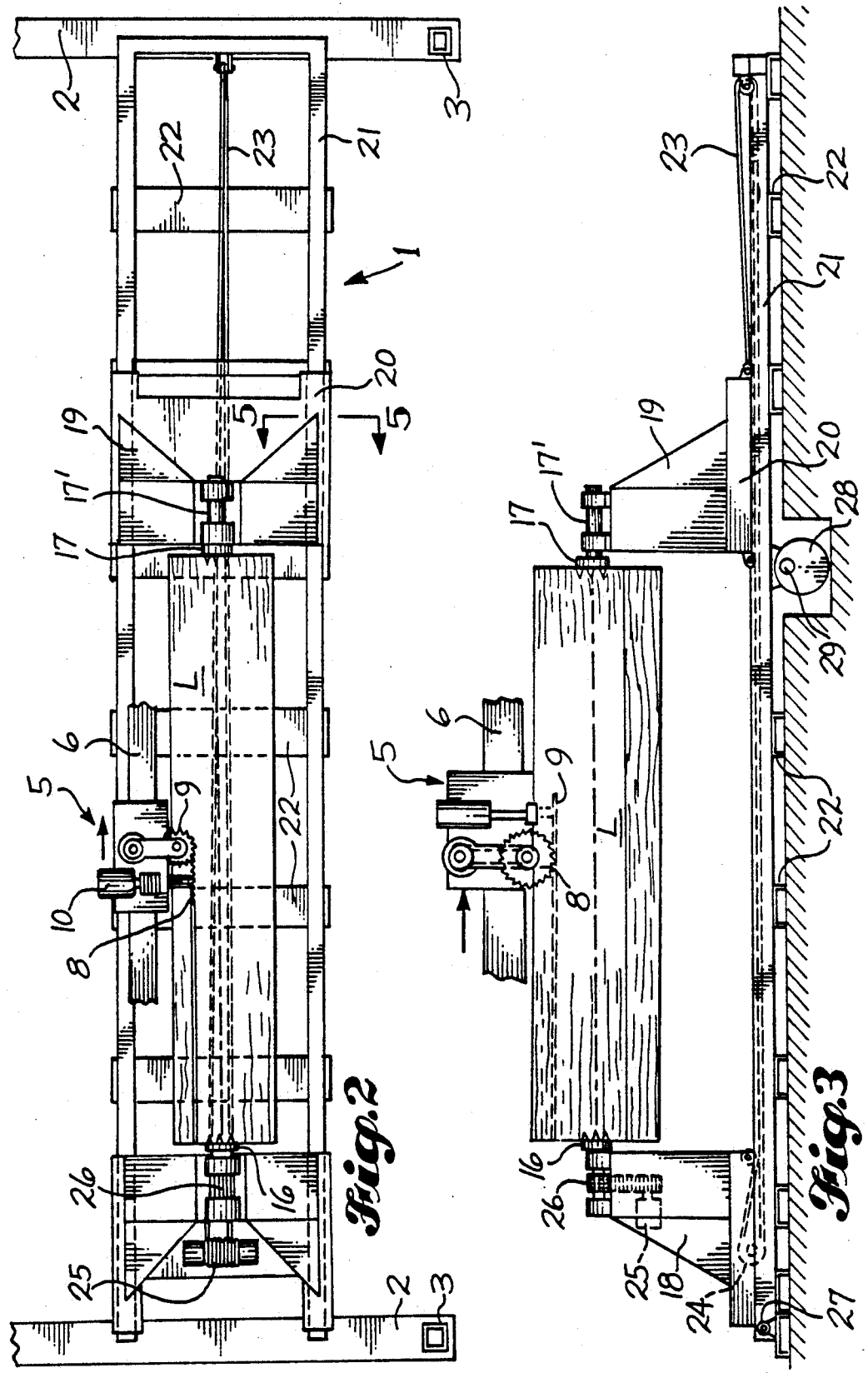

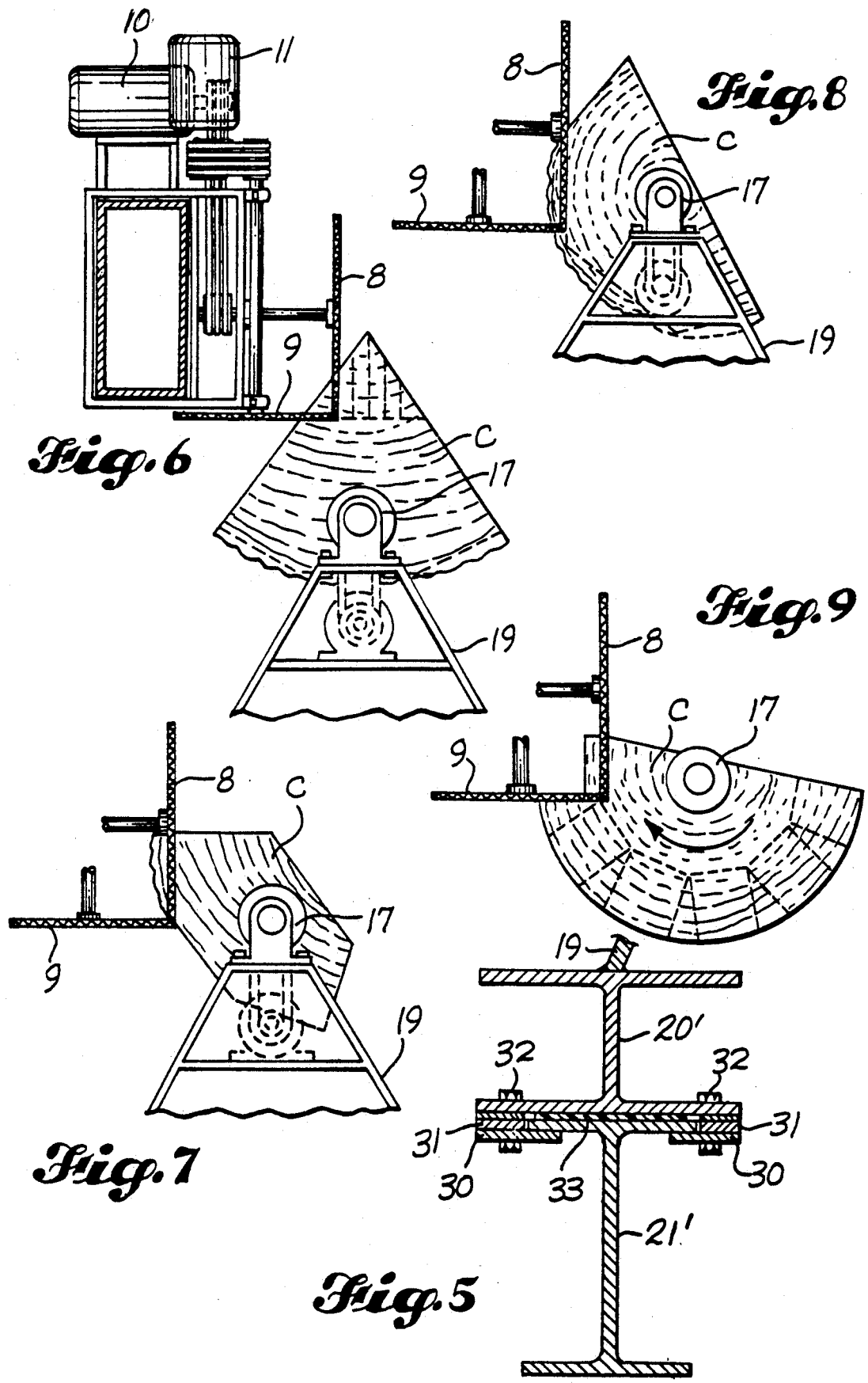

5,109,899

CANT-MAKING APPARATUS AND PROCESS

BACKGROUND OF THE INVENTION

1. Field of the Invention

This invention relates to apparatus and process for making cants from log sectors. Each log sector for making a cant will have an apex angle between about 20 degrees and 180 degrees, usually within the range of 30 degrees to 120 degrees, and such cant will be defined by two radial planes and the round or arcuate portion of the log circumference bridging between the outer edges of such planes.

The log sector will be supported between and by two centers engaging opposite ends of the log sector, respectively, to enable the log sector to be turned for presentation to an overhead sawing apparatus including a head saw and an edger saw in juxtaposed orthogonal relationship mounted on a carriage which is reciprocable along the length of the log sector on a track adjustable transversely and elevationally and somewhat angularly.

2. Prior Art

Logs have been sawn by prior apparatus while being held between centers or dogs so that the log could be turned about the axis of such centers. One such apparatus is shown in U.S. Pat. No. 4,271,736, issued Jun. 9, 1981, for Sawmill Apparatus with Vertically Movable Logging Dogs. Log-supporting dogs are mounted on a carriage relative to which the dogs are adjustable elevationally independent of each other but simultaneously, and the dogs can be rotated conjointly through 90 degrees for simultaneously rotating a log engaged thereby, whereby a second saw cut can be made in perpendicular relation to a first saw cut (column 3, lines 14 to 18 and column 4, line 64 to column 5, line 4).

The carriage on which the log-supporting dogs are mounted is reciprocated to carry the log through a band saw apparatus comprising a pair of endless bandsaw blades (column 6, lines 11 to 31). The spacing between the bandsaw blades can be varied depending upon the size of the log and the direction in which the log is passed through the bandsaws.

Log-sawing apparatus in which a log to be sawn is supported between and by clamps engaging the opposite ends of a log is disclosed in U.S. Pat. No. 4,867,213, issued Sep. 19, 1989, for System for Orienting Logs for Lumber Processing. This apparatus includes C-shaped clamps which fit around and receive the log from spindles that support the log while the apparatus is being set up. The clamps are driven into the log ends and the spindles are retracted (column 4, lines 36 to 39). Such clamps are mounted on a carriage which is reciprocated along tracks past a saw represented by the line 40 in FIG. 8 (column 4, lines 42 to 56). The knees supporting the clamps C can be moved transversely of the saw line such as in two-inch increments to cut successive boards or planks from the log (column 4, lines 51 to 56). When one side of the log is sawn down to the center cant, the log is pivoted 180 degrees and the sawing operation is repeated for the other side of the log (column 4, lines 56 to 58). Alternatively, the clamps can be turned for sawing the log on all four sides (column 4, line 65 to column 5, line 1).

SUMMARY OF THE INVENTION

It is a principal object of the present invention to produce a cant of polygonal cross-section devoid of bark from a log sector.

In accomplishing the aforesaid primary object, it is an object to slab the arcuate or round portion of the log sector to remove the bark from the log sector and to form planar contiguous chordal surfaces.

An additional optional object is to cut off the apex of the log sector and, in doing so, to cut blanks of uniform thickness for making boards or dimension lumber.

A further object incidental to the last-mentioned object is to edge the inner edges of such blanks and in some instances to cut the boards or dimension lumber to an approximate predetermined or selected nominal width, such as 4 inches, 6 inches, 8 inches, 10 inches or 12 inches.

Another object is to cut a log sector which is tapered lengthwise into a cant which will have flat sides that may all be parallel to a predetermined axis or one or more of which sides may be inclined relative to such axis.

It is also an object in cutting a log sector to form a cant as aforesaid by cutting the apex of such sector into board blanks and to make such cuts so that with the sides of the resulting cant all parallel to a predetermined axis the blanks may taper in width as cut from the sector and which can be edged in a subsequent operation to form boards having parallel edges.

Another object is to provide apparatus for supporting a log sector that will enable such log sector to be turned about a predetermined longitudinal axis between slabbing cuts.

The foregoing objects can be accomplished by apparatus including overhead sawing apparatus having a head saw and an edger saw mounted on a carriage which is reciprocable lengthwise of a log sector mounted between and by two centers engaged with opposite ends of such log sector, respectively, on which centers the log sector can be turned to present different arcs of the log sector to the sawing apparatus for making slabbing cuts. In addition, the apex of the log sector can be presented to the sawing apparatus for cutting a predetermined altitude of the log sector apex into blanks of uniform thickness for making boards or dimension lumber.

BRIEF DESCRIPTION OF THE DRAWINGS

FIG. 2 is a plan of the cant-making apparatus with parts broken away, and

FIG. 3 is a side elevation of the apparatus with parts broken away.

FIG. 5 is a detail section through a portion of the apparatus taken on line 5—5 of FIG. 2.

FIG. 6 is a somewhat diagrammatic end elevation of the cant-making apparatus showing the apex of a log sector being cut into board blanks or dimension lumber;

FIG. 7 is a corresponding view showing a slabbing cut being made on the log sector.

FIG. 8 is a somewhat diagrammatic end elevation of the cant-making apparatus with parts broken away showing a different type of log sector being cut into a cant.

FIG. 9 is a somewhat diagrammatic end elevation of the cant-making apparatus showing groups of board blanks or dimension lumber being cut from the periphery of a log sector.

DETAILED DESCRIPTION

The primary function of the apparatus is to make cants which have contiguous flat chordal sides and which are principally clear wood so that in a subsequent milling operation they may be cut by conventional sawing apparatus into clear lumber or sliced into edge-grain veneer. In making a cant from a log sector having an apex angle such as between 20 degrees and 160 degrees, preferably between 30 degrees and 120 degrees, it may be desirable to remove the apex portion of the sector so as to remove the principal portion of the log sector having knots.

At the same time it is desirable to provide apparatus which will enable the least waste of clear wood by making slabbing cuts to remove the bark from the log sector which are of substantially uniform radial depth throughout the length of the slab.

The cant-making apparatus preferably utilizes a ripsawing apparatus having a head saw and an edger saw in orthogonal relationship to the head saw which may be used for making slabbing cuts or for cutting blanks for boards or dimension lumber, preferably from the apex of the log sector but alternatively in groups from the circumferential margin of the log sector.

Figure 1:
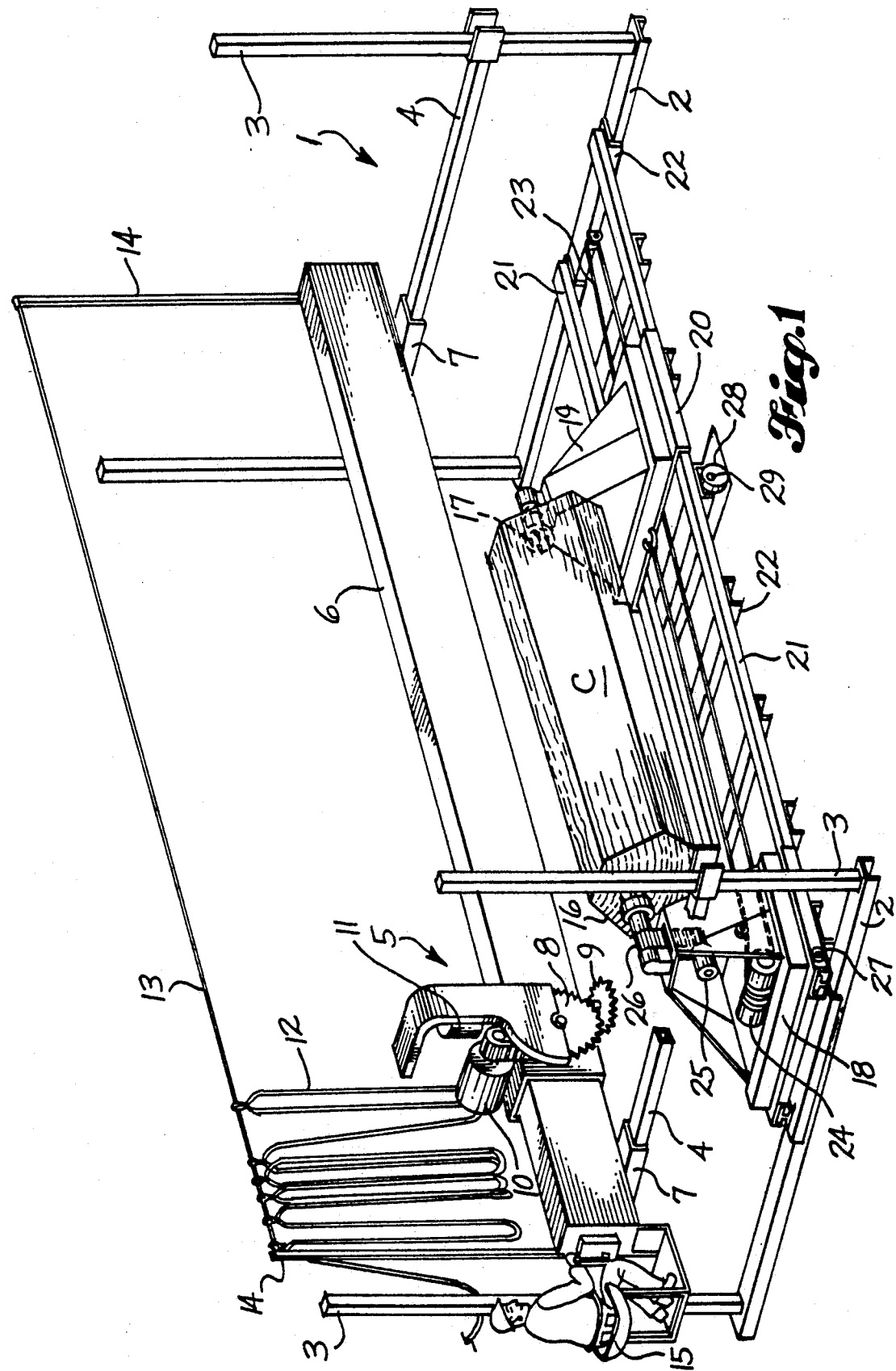
FIG. 1 is a top perspective of the apparatus showing a cant which has been made by the apparatus of the present invention.

FIG. 1 shows the overall cant-making apparatus 1 utilizing a known type of sawing apparatus. The cant-making apparatus includes a base frame having parallel spaced-apart end cross members 2 on the ends of which are mounted posts 3. Elevated rails 4 overlying the base end cross members 2 at the opposite ends of the apparatus, respectively, bridge between and are supported by posts 3 and can be moved elevationally conjointly by suitable mechanism which is not shown.

The sawing apparatus includes a carriage 5 that is movable longitudinally of a beam track 6 extending lengthwise perpendicular to the base members 2 and the rails 4. Such beam track is mounted on shoes 7 slidable along rails 4 to adjust the position of the beam track 6 transversely of the apparatus. Such beam track may be pivotally connected to one or both of the shoes 7 so that one shoe may be shifted relative to the other to swing the beam track relative to the rails 4.

The saw carriage 5 carries a circular head saw 8 rotatable about a horizontal axis and a cooperating edger saw 9 adjacent to the head saw 8 and rotatable about a vertical axis. The head saw 8 is driven by an electric motor 10, and the edger saw is driven by a separate electric motor 11 which are powered by an electric cable 12 arranged in loops that can be slid along a supporting wire 13 extending parallel to beam track 6 and extending between and carried by posts 14 mounted on the opposite ends of the beam track 6, respectively.

Shifting of the shoes 7 along rails 4 to establish the position of the beam track 6 elevationally, angularly and transversely of the apparatus and movement of the saw carriage 5 along beam track 6 is under control of an operator occupying the seat 15 mounted on one end of the beam track 6.

The log sector from which the cant C is made extends between and is supported by centers 16 and 17 engaging opposite ends of the log sector. The center 16 is a live center and is mounted on a headstock 18 while the center 17 is a dead center mounted on the tailstock 19. The tailstock is carried by a carriage 20 that is mounted slidably on base rails 21 extending between and supported by the end cross members 2 of the frame. Such rails are connected at intervals by intermediate cross members or ties 22.

The tailstock carriage 20 can be slid lengthwise along the base rails 21 by an endless line 23, the opposite ends of which are connected to opposite sides of the tailstock carriage. The portion of the line between its ends is wound several times around a winch drum 24 mounted on the headstock 18. One stretch of the line is connected between the drum and the side of the tailstock carriage 20 closer to it, and the other stretch of the line extends from the drum parallel to the first stretch of the line, past the tailstock carriage, around a pulley anchored to the end cross member 2 remote from the headstock and back to the side of the tailstock carriage farther from the drum. This latter stretch of the line constitutes a haulback so that, when the drum 24 is turned in the clockwise direction as seen in FIGS. 1 and 3, the haulback stretch of the line will slide the tailstock along rails 21 away from the headstock to provide ample space between the headstock center 16 and the tailstock center 17 to receive a log sector between them. Preferably the tailstock carriage 20 will be slidable along the rails 21 from a spacing of 6 feet to a spacing of 40 feet.

When the log sector has been placed between the centers 16 and 17, such as by being transported on the prongs of a forklift, the drum 24 can be driven in the counterclockwise direction as seen in FIGS. 1 and 3 to slide the tailstock carriage 20 toward the headstock and engage the centers 16 and 17 with the opposite ends of the log sector, respectively. The centers can be set firmly in the opposite ends of the log sector by moving dead center 17 toward live center 16 by a hydraulic jack 17 carrying the dead center. When the centers 16 and 17 have been set in the opposite ends of the log sector, the log sector can be turned about the axis of the centers by turning the live center 16 by an electric or hydraulic motor 25 through a drive chain 26.

Most logs are tapered to a greater or lesser extent from the butt end to the tip end, and it is desirable to be able to tilt the axis between the centers 16 and 17 relative to the sawing apparatus beam track 6 so as to be able to cut the apex portion of a log sector into boards or dimension lumber or to cut a slab of substantially uniform central radial thickness from a round portion of the sector to minimize waste of clear wood despite such taper. In order to avoid binding of the center supports and to enable them to be coaxial, however, it is important for the frame supporting the headstock 18 and the tailstock 19 formed by the grid of the rails 21 and intermediate cross members 22 to be tilted as a whole rather than the relative elevations of the centers being altered while maintaining the axes of the centers parallel but not in alignment.

Figure 4:
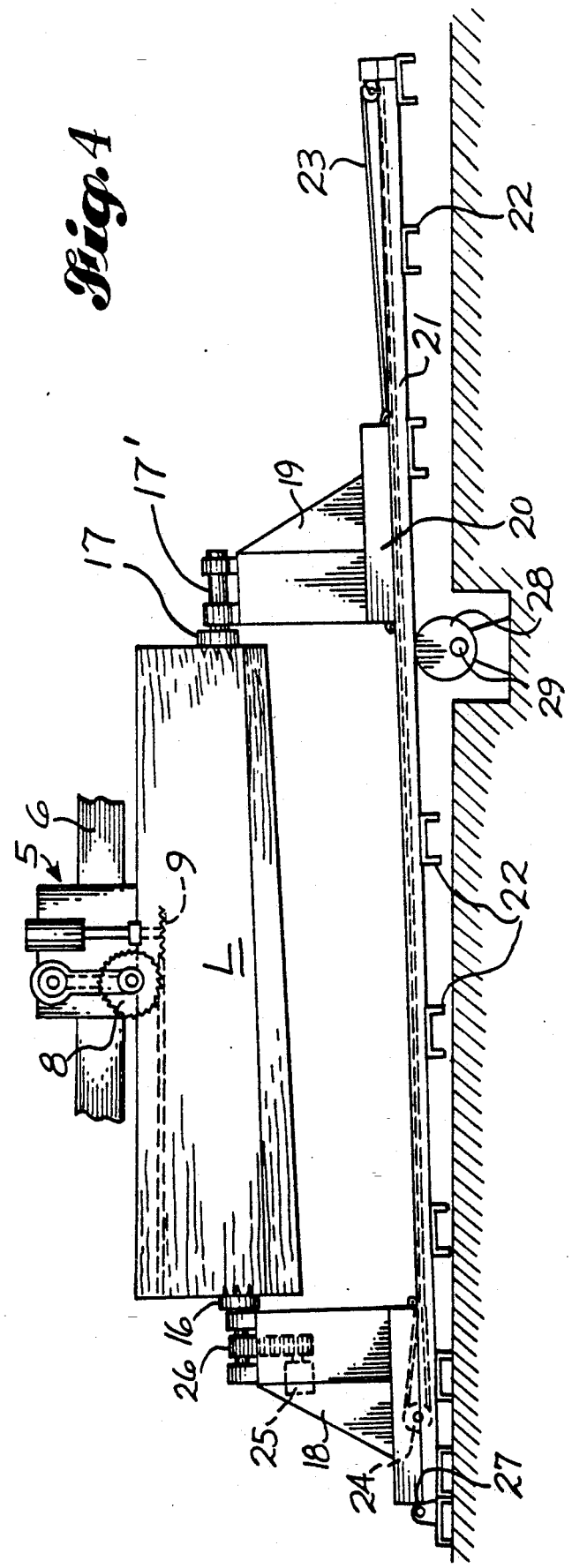
FIG. 4 is a side elevation of the cant-making apparatus with parts broken away and showing parts in positions different from the positions of the parts shown in FIG. 3.

To accomplish conjoint tilting of the headstock 18 and the tailstock 19, the end of the frame formed by the longitudinal rails 21 and the transverse members or ties 22 is mounted by a pivot rod or hinge means 27 on cross member 2 at the headstock end of the frame having an axis extending transversely of the saw-guiding beam track 6. As shown in FIG. 4, the frame 21, 22 can be tilted about the axis of the pivot or hinge means 27 relative to the saw carriage beam track 6. Such tilt can be effected by tilting means of various types, such as eccentrics 28 engageable with a crosstie 22 or the rails 21 of the frame and rotatable about an axis 29 offset from the center of the eccentrics, or by hydraulic jacks, or by a deformable parallel linkage jack, or by other suitable lifting mechanism. Such mechanism could be located generally centrally between the ends of the rails 21 if a short stroke were desirable, or could be located near the ends of the rails 21 remote from the pivot means 27 if greater leverage were desired and the rails 21 were of adequate beam strength.

Greater strength and stiffness could be provided for the rails 21 if they were made of I-beam or H-beam section, as shown at 21' in FIG. 5. The crossties 22 would then extend beneath and be secured to the bottom flanges of the H-beam or the I-beam, and the tailstock carriage side pieces 20' would be of H-beam cross section and the lower flanges would ride on the upper flanges of the rails 21'.

Inadvertent lifting of the tailstock 19 from the rails 21' could be prevented by strips 30 extending beneath the opposite flanges of the rail H-beam or I-beam. Such retainer strips could be spaced from the lower flange of the tailstock carriage 20' by spacer strips 31, and such spacer strips and retainer strips could be secured to the tailstock carriage by a plurality of bolts 32 spaced lengthwise of the rails 21'.

FIGS. 6, 7, 8 and 9 represent different steps in the process of making a flat-sided cant from a log sector. In considering the operation of the apparatus it is important to keep in mind that the objective is to provide a cant of polygonal cross section which is of substantially clear wood. Consequently, it is important to discard as little good wood as possible in making the cant, even if the resulting cant tapers lengthwise to some extent.

In the first place, both the live center 16 and the dead center 17 should be placed in the radial plane bisecting the arc of the log sector curved circumference. If it is desired to make a cant which does not taper lengthwise, the centers should be set in the log sector ends so that the radial distances from the log centers to the curved or rounded periphery of the sector in the bisecting radial plane are equal. With the apex of the log sector down the first slabbing cut can be taken with the log-supporting mechanism frame 21, 22 in the lowered position shown in FIG. 3 and the bisecting radial plane of the log sector vertical. The arcuate top of the log sector can then be slabbed to form a plane by cutting with the edger saw 9. It may be necessary to make more than one pass of the saw carriage 5 along the beam track 6 from end to end of the log sector in order to make such a slabbing cut because the width of each cut is limited to less than the radius of the edger saw, which saw may be 26 inches in diameter so that it may make only a 10 or 12 inch wide cut. Successive coplanar cuts may be made by the saw carriage 5 traveling in opposite directions along the beam track 6.

The first slabbing cut thus made will provide a flat reference surface. When such cut has been completed, the motor 25 can be energized for turning the log sector 180 degrees to the position shown in FIG. 6. If it is desired for opposite sides of the cant to be parallel, blanks for making boards or dimension lumber can be cut out of the apex as indicated in FIG. 6 to the depth necessary to remove the heart wood having knots from the apex portion of the sector. The blanks thus cut from the sector apex will be of uniform thickness but will be tapered lengthwise to some extent, and the edges of such blanks opposite the edger saw cut will be beveled. It will therefore be necessary to subject such blanks to a subsequent edging operation to cut boards from them which will be of uniform width throughout their length and will have parallel opposite edges. Also, the width of the boards thus edged will be of conventional selected widths, usually in even nominal 2-inch widths, such as 4 inches, 6 inches, 8 inches, 10 inches or 12 inches.

If it is not necessary for the opposite planar sides of the cant to be parallel, clear wood can be saved by tilting the frame 21, 22 supporting the headstock and tailstock about the axis of pivot means or hinge means 27 to minimize the depth of the apex cut. In such case the blanks for boards or dimension lumber cut from the apex can be of substantially equal width, and the upper and lower flat sides of the cant being made will converge toward the tailstock.

Either before or after the log sector apex is removed, if it is removed at all, the additional arcuate circumference of the cant is slabbed to provide flat surfaces contiguous with the reference surface first slabbed. If all of the flat faces of the cant are to be parallel to the axis defined by the live center 16 and the dead center 17, all of the cuts can be taken with the headstock- and tailstock-supporting frame 21, 22 in the lowered position of FIG. 3. Again, however, if it is desired to save as much good wood as possible in the cant without requiring that the flat surfaces be parallel to the axis of the centers, the motor 25 can be energized to rotate live center 16 to a position for making a top slabbing cut with the edger saw 9 at a location adjacent to the reference slabbed surface but with the frame 21, 22 tilted upward, such as indicated in FIG. 4, to a position in which the central radial thickness of the slab being cut will be substantially uniform throughout its length. Under such circumstances the flat chordal surface thus formed will converge toward the axis of the centers 16 and 17 from the headstock end of the log sector to its tailstock end.

Alternatively, slabbing cuts can be made by the headsaw 8 instead of by the edger saw 9, as indicated in FIG. 7. In that figure the width of the slabbing cut is shown as being less than the radius of the headsaw. A headsaw is available which has a recess at its center so that the nut securing the saw to the shaft will be recessed from the face of the saw so that a wider cut can be taken up to the full diameter of the headsaw. Also, because the slides 7 can be moved on the rails 4 relative to each other to some extent, the beam track 6 can be set at an angle to the axis joining the centers 16 and 17 corresponding to the taper from the butt toward the tip of the side of the log sector to be slabbed so that the central portion of the slab cut off by the headsaw is of substantially uniform thickness from end to end.

As indicated in FIG. 8, cants can be made from log sectors having an apex angle as much as 180 degrees, which means one-half of a log. In such case the flat diametral surface will serve as the reference surface, but again it is desirable for the live center 16 and the dead center 17 to be located in the radial bisecting plane of the log sector.

If it is desired that all of the flat faces of the resulting cant be parallel to the axis of the centers 16 and 17, such two centers should be located equal distances from the reference surface in such log sector bisecting plane. In such case it will then only be necessary to rotate the live center 16 by energization of the motor 25 to place various arcs of the log sector periphery in the top position to be slabbed successively by the edger saw 9 or with the chord of each arc to be slabbed in a vertical plane to be cut by the headsaw as shown in FIG. 8. Again it may be necessary to take more than one cut in cutting each slab or the chord of each arc slabbed could be reduced to enable the edger saw or the headsaw to cut each such slab in one pass.

If it is desired to save as much good wood as possible, the slabbing cuts could be made so that the flat slabbed chordal surfaces are not parallel to the axis defined by the centers but converge to a greater or lesser extent toward such axis from the butt end of the log sector to the tip end of such sector. To effect such savings, the sector will be mounted between the centers 16 and 17 so that the butt end of the sector will be engaged by the live center 16 and the tip end of the sector will be engaged by the dead center 17. Before making each slabbing cut, the stock-supporting frame 21, 22 can then be tilted as shown in FIG. 4 so that in each instance a slab of approximately uniform radial thickness from end to end will be cut but the resulting flat slabbed face will not be parallel to the axis of the centers 16 and 17 but will converge toward such axis from the butt end of the log sector toward the tip end of the log sector.

Alternatively, the apparatus of the present invention can be used to cut board blanks or substantially square cross-section cants as shown in FIG. 9, or dimension lumber from the circumferential portion of a log sector. In such case, a group of board blanks or substantially square cross-section cants or dimension lumber pieces can be cut from one section of the circumferential portion of the log sector followed by cutting a wedge-shaped cant and then cutting another, group of board blanks or substantially square cross-section cants or dimension lumber from the next section of the circumferential portion of the log sector, as shown in FIG. 9. The wedge-shaped cant between the sections of the circumferential portion of the log sector can be remanufactured into appropriate lumber pieces.

I claim:

1. Apparatus for making a cant from a log sector, comprising sawing means, overhead track means supporting said sawing means for travel longitudinally of said track means, means supporting said track means for adjustment both elevationally and horizontally transversely of their length, a live center and a dead center engageable with opposite ends, respectively, of a log sector to be cut into a cant by said sawing means, means supporting one of said centers for movement relative to the other of said centers for engaging the opposite ends of the log sector, respectively, by said centers, and means for rotating said live center to present different sides of the log sector to be cut by said sawing means.

2. The apparatus defined in claim 1, and mounting means for supporting both the live center and the dead center in coaxial relationship, and means for tilting said mounting means about an axis extending transversely of the track means for changing the angular relationship between the axis joining the centers and the track means.

3. The apparatus defined in claim 1, in which the means supporting one of the centers for movement relative to the other of the centers includes carriage means supporting the movable center and means for moving said carriage means toward and away from the other center to alter the distance between the centers.

4. The apparatus defined in claim 2, cable means connected to the carriage, and winch means operable to wind said cable means for moving the carriage means.

5. The apparatus defined in claim 3, and mounting means for supporting both the carriage means and the other center, and means for tilting said mounting means about an axis extending transversely of the track means for changing the angular relationship between the axis joining the centers and the track means.

6. A process for making a cant from a log sector which is tapered lengthwise, which comprises supporting the log sector by centers engageable with its opposite ends in proximity to sawing means mounted to travel lengthwise of the log sector, tilting the centers conjointly and the line of travel of the saw means relatively so as to cut a slab from a round portion of the log sector which is of substantially uniform central radial thickness throughout its length, and moving the sawing means lengthwise of the log sector and thereby cutting such slab from the log sector.

7. A process for making a cant from a log sector which has an apex angle less than 180 degrees, which comprises cutting the apex of the log sector to a predetermined depth into lumber-making blanks and slabbing the round portion of the sector to remove the bark therefrom.

8. The process defined in claim 7, including supporting the log sector by centers engageable with its opposite ends in proximity to sawing means mounted to travel lengthwise of the log sector, and tilting the centers conjointly relative to the course of travel of the sawing means for cutting lumber-making blanks from the apex of the log sector having their widths disposed generally radially of the log sector, and which blanks are tapered lengthwise in width.

9. A process for making a cant from a log sector which is tapered lengthwise which comprises supporting the log sector by centers engageable with its opposite ends in proximity to sawing means mounted to travel lengthwise of the log sector, tilting the centers conjointly and the line of travel of the saw means relatively so as to cut a slab from the log sector which is of substantially uniform central radial thickness throughout its length, moving the sawing means lengthwise of the log sector and thereby cutting a slab from a round portion of the log sector, turning the log sector about the axis of the centers and moving the sawing means lengthwise of the log sectors and thereby cutting a further slab from another round portion of the log sector which is of substantially uniform central radial width throughout its length.

10. A process for making a cant from a log sector which has an apex angle less than 180 degrees which comprises supporting the log sector by centers engageable with its opposite ends in proximity to sawing means mounted to travel lengthwise of the log sector, moving the sawing means lengthwise of the log and thereby cutting a slab from a round portion of the log sector, turning the log sector about the axis of the centers, moving the sawing means lengthwise of the log sector and thereby cutting a further slab from another round portion of the log sector, and turning the log sector about the axis of its supporting centers for disposition of the apex of the log sector to be cut to a predetermined depth into lumber-making blanks by the sawing means.

11. The process defined in claim 10, including tilting the centers conjointly relative to the course of travel of the sawing means for cutting lumber-making blanks having their widths disposed generally radially of the log sector and which blanks are tapered lengthwise in width.

* * * * *

UNITED STATES PATENT AND TRADEMARK OFFICE
CERTIFICATE OF CORRECTION

PATENT NO. : 5,109,899

DATED : May 5, 1992

INVENTOR(S) : Ken Hendrickson

It is certified that error appears in the above-identified patent and that said Letters Patent is hereby corrected as shown below:

Title page, under "United States Patent [19]" and at [76], cancel "Henderickson" and insert --Hendrickson--.

Signed and Sealed this

Tenth Day of May, 1994

*Attest:*

BRUCE LEHMAN

*Attesting Officer*  *Commissioner of Patents and Trademarks*